2 Sheets—Sheet 1.

W. HERRMANN.

Cotton Cleaner.

No. 9,349. Reissued Aug. 24, 1880.

Witnesses:
Geo. H. Knight
Walter Allen

Inventor:
William Herrmann
By Knight Bro.
Attys

N. PETERS, PHOTO-LITHOGRAPHER, WASHINGTON, D. C.

2 Sheets—Sheet 2.

W. HERRMANN.
Cotton Cleaner.

No. 9,349. Reissued Aug. 24, 1880.

Witnesses:
Geo. H. Knight
Walter Allen

Inventor:
William Herrmann
By Knight Bros.
Attys.

N. PETERS, PHOTO-LITHOGRAPHER, WASHINGTON, D. C.

UNITED STATES PATENT OFFICE.

WILLIAM HERRMANN, OF COTTON PLANT, MISSOURI.

COTTON-CLEANER.

SPECIFICATION forming part of Reissued Letters Patent No. 9,349, dated August 24, 1880.

Original No. 200,721, dated February 26, 1878. Application for reissue filed December 23, 1879.

*To all whom it may concern:*

Be it known that I, WILLIAM HERRMANN, of Cotton Plant, in the county of Dunklin and State of Missouri, have invented a certain new and useful Improvement in Cotton-Cleaners, of which the following is a full, clear, and exact description, reference being had to the accompanying drawings, forming part of this specification.

My improved cotton-cleaner consists of a chamber surrounded exteriorly by an inclosing-case, said chamber having gauze-covered bottom and sides and open ends, the opening at the feed end being for the purpose of allowing the escape of dust, &c., while the opening at the discharge end is for the purpose of allowing the escape of the cleaned cotton; a series of beaters arranged within this chamber, one beater of the said series being immediately underneath the hopper, and the rest of the series being arranged longitudinally of the chamber, each beater consisting of a series of fingers, which, during their revolution, overlap one another and clean the cotton therefrom by their scraping or knocking action upon one another, and a blower arranged at one end of the case to force air through a passage toward the feed end of the machine.

Figure 1:
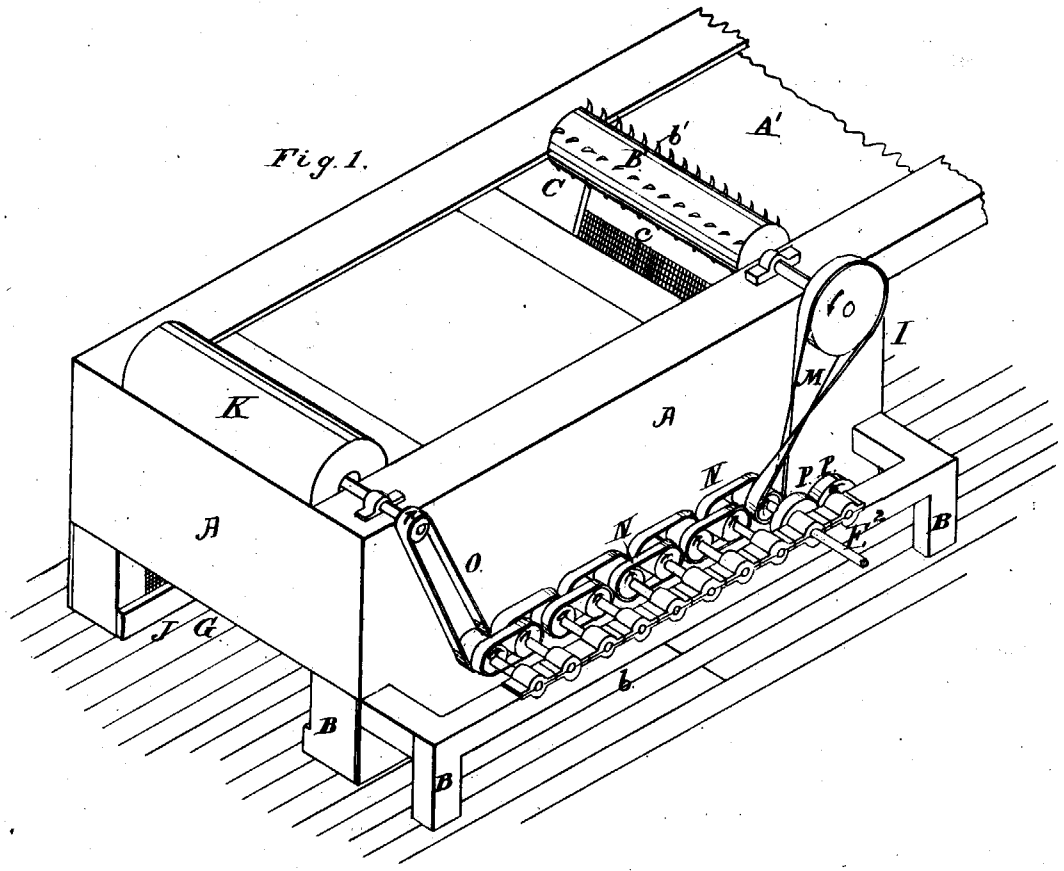
Figure 2:
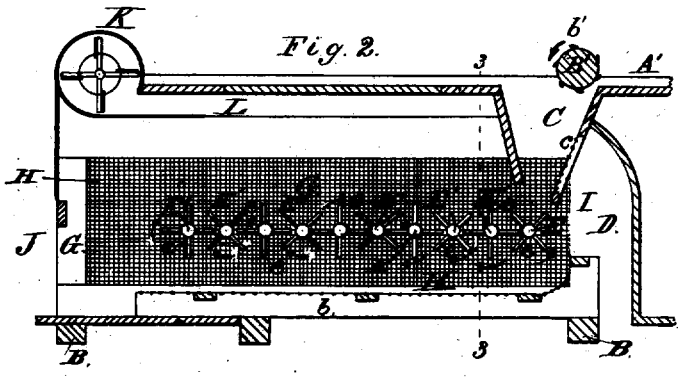
Figure 3:
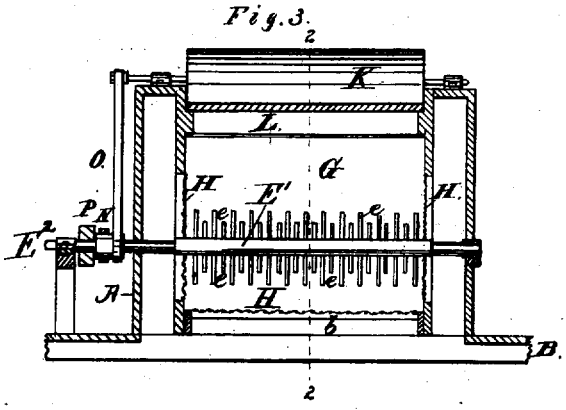

In the accompanying drawings, Figure 1 is a perspective view of the machine with the feed-board partly broken away. Fig. 2 is a longitudinal section on the line 2 2, Fig. 3. Fig. 3 is a transverse section on the line 3 3, Fig. 2.

A is the outer case, supported on a platform, B, having openings *b* for the escape of the impurities separated from the cotton.

A′ is the feed board or way over which the cotton is carried by the toothed feed-roller B′. The points *b′* of this roller engage with the cotton on the feed-board A′ and drag it along and drop it into the hopper C.

*c* is a sheet of gauze or wire-work stretched over an opening in the side of the hopper C, through which dust and other impurities may drop into the opening D beneath. From the hopper the cotton drops into a trough or cleaning-chamber, G, which is open at both ends, I and J, and has a gauze-covered bottom and sides, H, to allow of the dust and other impurities freely escaping during the beating of the cotton. The cotton, when it drops down the hopper, falls upon the first rotary beater E, which is immediately under the hopper, and by the rotation of this beater and the next beater, E′, in opposite directions the cotton is carried to the bottom of the chamber beneath the beaters, and is fed backward by the other beaters of the series and discharged at J. These beaters E E′ have each a number of pins or fingers, *e*, arranged around its circumference and extending outwardly therefrom, so that the fingers of one beater shall overlap the fingers of the adjacent beater. The action of each advancing beater-finger is, first, to knock the ascending cotton from the fingers of the adjacent receding beater, and then throw it up against the fingers of the succeeding beater, thereby dislodging the impurities from the cotton, which impurities will escape either through the gauze at either the bottom or sides, or else float up into the top of the chamber and be blown out through and over the gauze, or through the gauze at the feed end I of the machine.

K represents a blower, which may be of the common rotary kind, such as shown, said blower receiving air at the end J and discharging it through a passage, L, toward the end I, so as to carry the dust and light impurities to and out of the feed end of the case.

The various rotating parts—namely, the feed-roller, blower, and beaters—may have motion imparted to them by any suitable means.

In the system I have shown the shafts of these parts are connected by pulleys and belts, and motion will be communicated simultaneously to all these parts. I have shown the shaft $E^2$ of the second beater as the main shaft. The belt from this shaft $E^2$ to the feed-roll shaft is lettered M, the belts from beater to beater are lettered N, and the belt from the last beater to the blower is lettered O. P P are friction-wheels, whereby power is communicated from the main shaft $E^2$ to the end beater E.

The cotton is carried upon the feed-board to the feed-roll B′ and presented to the teeth *b′*, which, on the roll being revolved, take into the cotton and feed it forward to and into the hopper C. The cotton having been fed into the hopper by the operation of the roller B′, it falls upon the beater E immediately beneath the hopper, which, revolving as it does toward the other end, J, of the machine, carries the cotton to the next adjacent beater E′, which revolves in a contrary direction to that of the first beater E, (or toward the feed end of the machine.) This second beater, in turn, carries the cotton to the beater next adjacent thereto in the direction of the delivery end of the machine, and so on until the last beater is reached, when the cotton will drop out at the delivery end cleaned. The cotton as it leaves the machine may be carried by an endless belt or other conveyer direct to the gin, and this conveyer may be actuated by belt or other connection to either the cleaner or the gin.

As the cleaner operates on the cotton before the removal of the seed, there is scarcely any loose fluff or wool, and consequently the cotton is not wasted by the air-current through the cleaner.

The peculiar construction of the cleaning-chamber, moreover, by allowing of the immediate and automatic discharge therefrom of all dust and light impurities by the action of the air-blast and the discharge of the heavier impurities through the wire-work bottom, greatly facilitates the cleaning of the cotton.

I claim—

1. In a cotton-cleaner, the combination of beater E, located beneath the hopper, and a series of beaters, E′, each of said beaters having prongs *e*, adapted to overlap in the manner described, so that the cotton may be beaten up between them, as set forth.

2. The combination of chamber G, having wire-work bottom and sides, with a series of rotary beaters provided with a series of fingers adapted during their revolution to overlap each other and clean the cotton, and a blower arranged to force air through said chamber, substantially as set forth.

3. The combination of feed-roll B′, chamber G, reticulated bottom and sides H, blower K, and rotary beaters E E′, having overlapping fingers *e*, as and for the purpose set forth.

4. The combination of the outer case, A, with the cleaning-chamber G, having wire bottom and sides H, open ends I J, and air-passage L, as and for the purpose set forth.

WILLIAM HERRMANN.

Witnesses:
WM. M. SATTERFIELD,
THOMAS R. NEEL.